United States Patent
Fryer et al.

(10) Patent No.: US 12,055,058 B2
(45) Date of Patent: Aug. 6, 2024

(54) JOINT BETWEEN GAS TURBINE ENGINE COMPONENTS WITH A SPRING ELEMENT

(71) Applicant: Pratt & Whitney Canada Corp., Longueuil (CA)

(72) Inventors: Michael Fryer, Oakville (CA); Martin Dobson, Brossard (CA); Oleg Iskra, Oakville (CA); Marc Lavoie, Otterburn Park (CA); Ivan Sidorovich Paradiso, Toronto (CA); Louis Duranleau-Hendrickx, Montreal (CA); Domenico Di Florio, Saint Lazare (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/828,652

(22) Filed: May 31, 2022

(65) Prior Publication Data

US 2023/0407766 A1 Dec. 21, 2023

(51) Int. Cl.
*F01D 25/24* (2006.01)

(52) U.S. Cl.
CPC .......... *F01D 25/24* (2013.01); *F05D 2220/32* (2013.01); *F05D 2240/14* (2013.01)

(58) Field of Classification Search
CPC ... F01D 25/24; F05D 2220/32; F05D 2240/14
USPC ........................................................ 415/220
See application file for complete search history.

(56) References Cited

U.S. PATENT DOCUMENTS

| | | | | |
|---|---|---|---|---|
| 956,185 | A * | 4/1910 | Schoelkopf | F16B 39/286 411/937.1 |
| 1,049,590 | A * | 1/1913 | Mosher | F16B 37/00 411/959 |
| 1,291,114 | A * | 1/1919 | Pickin | F16B 39/38 411/285 |
| 2,838,935 | A * | 6/1958 | Di Cecio | F16P 7/00 374/208 |
| 3,167,733 | A * | 1/1965 | Di Noia | G01K 1/14 374/185 |
| 3,910,036 | A * | 10/1975 | Irwin | F23R 3/007 60/753 |
| 3,936,217 | A * | 2/1976 | Travaglini | F01D 21/003 415/118 |
| 3,992,127 | A * | 11/1976 | Booher, Jr. | F01D 25/005 415/200 |

(Continued)

OTHER PUBLICATIONS

EP Search Report for EP Patent Application No. 23176392.1 dated Oct. 6, 2023.

*Primary Examiner* — Logan M Kraft
*Assistant Examiner* — John D Bailey
(74) *Attorney, Agent, or Firm* — Getz Balich LLC (57) ABSTRACT

An assembly is provided for a gas turbine engine. This gas turbine engine assembly includes a case, a housing, a component and a spring element. The case includes an aperture that extends axially along an axis through the case. The housing is attached to the case with a cavity formed by and axially between the housing and the case. The component includes a base and a projection. The base is disposed within the cavity and axially engages the case. The projection projects out from the base and axially through the aperture. The spring element is disposed within the cavity. The spring element is compressed axially between and engages the base and the housing.

2 Claims, 11 Drawing Sheets

(56) References Cited

U.S. PATENT DOCUMENTS

| | | | | |
|---|---|---|---|---|
| 4,053,257 | A * | 10/1977 | Rahaim | F01D 9/042 415/217.1 |
| 4,300,774 | A * | 11/1981 | Hollis | G01K 1/14 277/630 |
| 4,406,580 | A | 9/1983 | Baran, Jr. | |
| 4,487,014 | A * | 12/1984 | Vinciguerra | F02C 7/20 60/797 |
| 4,522,559 | A * | 6/1985 | Burge | F01D 25/26 415/196 |
| 4,815,276 | A * | 3/1989 | Hansel | F01D 25/00 60/803 |
| 5,115,636 | A * | 5/1992 | Zeiser | F01D 21/003 60/803 |
| 5,185,996 | A * | 2/1993 | Smith | F01D 17/02 415/118 |
| 5,431,534 | A * | 7/1995 | Charbonnel | F01D 21/003 415/138 |
| 5,613,549 | A * | 3/1997 | Dolwani | F01P 11/16 165/71 |
| 5,662,418 | A * | 9/1997 | Deak | G01K 13/02 374/208 |
| 5,749,616 | A * | 5/1998 | Steever | A62C 33/00 211/184 |
| 5,867,976 | A * | 2/1999 | Ziegler, Jr. | F01D 21/003 60/803 |
| 6,438,940 | B1 * | 8/2002 | Vacek | F02C 7/266 60/204 |
| 6,494,684 | B1 * | 12/2002 | Wagner | F01D 5/3015 416/221 |
| 6,726,448 | B2 * | 4/2004 | McGrath | F01D 11/12 415/173.3 |
| 7,434,670 | B2 * | 10/2008 | Good | F01D 25/005 188/380 |
| 8,047,769 | B2 * | 11/2011 | Ballard, Jr. | F01D 25/00 415/138 |
| 8,171,719 | B2 * | 5/2012 | Ryan | F02C 7/264 60/39.821 |
| 8,197,187 | B2 * | 6/2012 | Walker | F01D 25/24 415/118 |
| 9,157,638 | B2 * | 10/2015 | Ponziani | F23R 3/60 |
| 9,366,578 | B2 * | 6/2016 | Cuypers | G01J 5/004 |
| 9,574,599 | B2 * | 2/2017 | Marc | F16B 39/22 |
| 10,041,413 | B2 * | 8/2018 | Huang | F23R 3/60 |
| 10,094,244 | B2 * | 10/2018 | Fitzpatrick | F01D 11/003 |
| 10,329,930 | B2 * | 6/2019 | Roussille | F01D 25/246 |
| 10,472,072 | B2 * | 11/2019 | Beers | B64D 13/02 |
| 10,731,488 | B2 * | 8/2020 | Genin | F02C 6/12 |
| 10,996,113 | B2 * | 5/2021 | Foreman, Jr. | G01K 7/02 |
| 11,092,083 | B2 * | 8/2021 | Clark | G01L 9/008 |
| 11,366,023 | B2 * | 6/2022 | Obillo | G01K 13/02 |
| 11,624,294 | B1 * | 4/2023 | Moffett | F01D 25/24 415/118 |
| 2003/0159446 | A1 * | 8/2003 | Parker | F01D 21/003 60/803 |
| 2003/0202876 | A1 * | 10/2003 | Jasklowski | F01D 25/246 415/135 |
| 2004/0111829 | A1 * | 6/2004 | Bruno | F01D 9/065 16/2.2 |
| 2005/0073114 | A1 * | 4/2005 | Amos | F23R 3/002 277/644 |
| 2005/0152433 | A1 * | 7/2005 | Howard | G01K 1/14 374/208 |
| 2007/0098546 | A1 * | 5/2007 | Cairo | F01D 11/005 415/170.1 |
| 2009/0053050 | A1 * | 2/2009 | Bruce | F01D 25/246 415/200 |
| 2011/0274538 | A1 * | 11/2011 | Shi | F01D 25/26 415/200 |
| 2013/0154169 | A1 * | 6/2013 | Myers | F02C 7/32 267/103 |
| 2013/0224011 | A1 * | 8/2013 | Hashimoto | F01D 25/162 415/211.2 |
| 2014/0013767 | A1 | 1/2014 | Bohney | |
| 2014/0116057 | A1 * | 5/2014 | Peters | F23R 3/007 403/322.2 |
| 2014/0366543 | A1 * | 12/2014 | Potts | F02C 7/28 29/888.011 |
| 2016/0032747 | A1 * | 2/2016 | Bez | F01D 11/005 277/647 |
| 2016/0186825 | A1 * | 6/2016 | Winkler | F16D 65/18 188/106 F |
| 2016/0356223 | A1 * | 12/2016 | Huang | F02C 7/28 |
| 2017/0044909 | A1 * | 2/2017 | Riazantsev | F01D 5/187 |
| 2017/0159463 | A1 * | 6/2017 | Mukherjee | F01D 11/16 |
| 2017/0362961 | A1 * | 12/2017 | Shirota | F01D 25/00 |
| 2018/0023408 | A1 * | 1/2018 | Rice | F01D 11/08 415/173.1 |
| 2018/0038241 | A1 * | 2/2018 | Betancourt | F01D 25/24 |
| 2018/0111752 | A1 * | 4/2018 | Georgas | B65F 1/12 |
| 2018/0202659 | A1 * | 7/2018 | Stieg | F23R 3/002 |
| 2018/0328721 | A1 * | 11/2018 | Hatcher, Jr. | F01D 25/24 |
| 2019/0010822 | A1 * | 1/2019 | McCaffrey | F01D 11/22 |
| 2019/0063320 | A1 * | 2/2019 | Choi | F23R 3/002 |
| 2020/0080478 | A1 * | 3/2020 | Rogers | F01D 25/183 |
| 2020/0096331 | A1 * | 3/2020 | Warren | F01D 21/003 |
| 2020/0149418 | A1 * | 5/2020 | Whittle | F01D 5/284 |
| 2020/0200387 | A1 * | 6/2020 | Hu | F23R 3/007 |
| 2020/0378308 | A1 * | 12/2020 | Slaney | F02K 1/805 |
| 2021/0332710 | A1 * | 10/2021 | White, III | F01D 25/246 |
| 2023/0093292 | A1 | 3/2023 | Dobson | |

\* cited by examiner

JOINT BETWEEN GAS TURBINE ENGINE COMPONENTS WITH A SPRING ELEMENT

TECHNICAL FIELD

This disclosure relates generally to a gas turbine engine and, more particularly, to a joint between components of the gas turbine engine.

BACKGROUND INFORMATION

Various types and configurations of joints between engine components are known in the art for a gas turbine engine. While these known joints have various benefits, there is still room in the art for improvement.

SUMMARY

According to an aspect of the present disclosure, an assembly is provided for a gas turbine engine. This gas turbine engine assembly includes a case, a housing, a component and a spring element. The case includes an aperture that extends axially along an axis through the case. The housing is attached to the case with a cavity formed by and axially between the housing and the case. The component includes a base and a projection. The base is disposed within the cavity and axially engages the case. The projection projects out from the base and axially through the aperture. The spring element is disposed within the cavity. The spring element is compressed axially between and engages the base and the housing.

According to another aspect of the present disclosure, another assembly is provided for a gas turbine engine. This gas turbine engine assembly includes a case, a housing, a component and a spring element. The case includes an aperture that extends axially along an axis through the case. The housing is attached to the case. The component includes a base and a projection. The base includes a channel. The projection projects out from the base and axially through the aperture. The spring element is seated in the channel. The base and the spring element are clamped axially between case and the housing.

According to still another aspect of the present disclosure, another assembly is provided for a gas turbine engine. This gas turbine engine assembly includes a fluid intake and a spring element. The fluid intake extends axially along an axis between a first end and a second end. The fluid intake includes a base, a projection and a passage. The base includes a channel. The channel projects axially into the base from the first end. The channel extends circumferentially within the base about the passage. The projection projects axially out from the base to the second end. The passage extends within the fluid intake between an inlet and an outlet. The inlet is disposed at the second end. The outlet is disposed at the first end. The spring element is seated in the channel. A portion of the spring element projects axially out from the channel and away from the base at the first end.

The base may axially contact the case. The spring element may axially contact the housing.

The spring element may be configured as or otherwise include a coil spring.

The spring element may be configured as or otherwise include a gasket.

The spring element may extend circumferentially about the axis.

The base may be axially spaced from the housing by an axial gap having a gap height. The spring element may be formed from material having a material thickness that is less than the gap height.

The assembly may also include a channel projecting axially into the base. The channel may extend radially into the base. Alternatively, the channel may extend radially within the base. The channel may extend circumferentially about the axis within the base. The spring element may be seated within the channel.

The assembly may also include an anti-rotation feature preventing or limiting rotation of the component about the axis relative to the housing.

An outer periphery of the base may have a cross-sectional geometry with a curved section and a straight section.

The curved section may extend circumferentially about the axis between opposing ends of the straight section.

An outer periphery of the base may have a cross-sectional geometry with a plurality of straight sections.

The base may include a notch that projects radially into the base. The housing may include a protrusion that projects radially into the notch.

The protrusion may be configured as or otherwise include a fastener.

The cavity may project axially into the housing.

The assembly may also include a gasket axially between and contacting the case and the housing.

The housing may contact the case.

The projection may project out from the base, axially through the aperture and away from the case to a distal end of the projection. The component may also include an inlet, an outlet and a component passage. The inlet may be disposed at the distal end of the projection. The outlet may be disposed in the base. The passage may extend within the component from the inlet to the outlet.

The assembly may also include a fluid conduit. The component may be configured as a fluid intake. The fluid intake may be fluidly coupled with the fluid conduit through the housing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
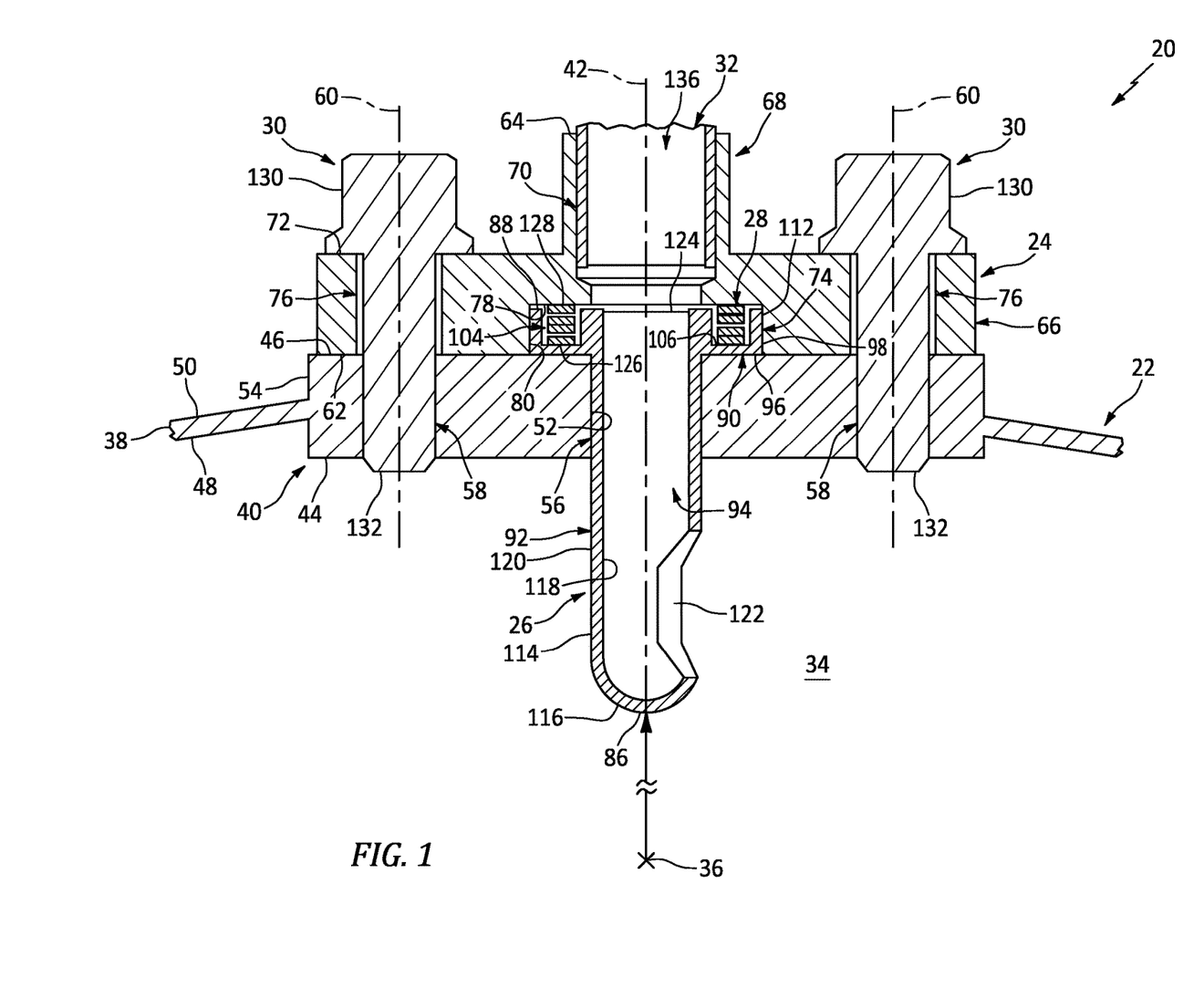
FIG. 1 is a partial cross-sectional illustration of an engine assembly.
Figure 2:
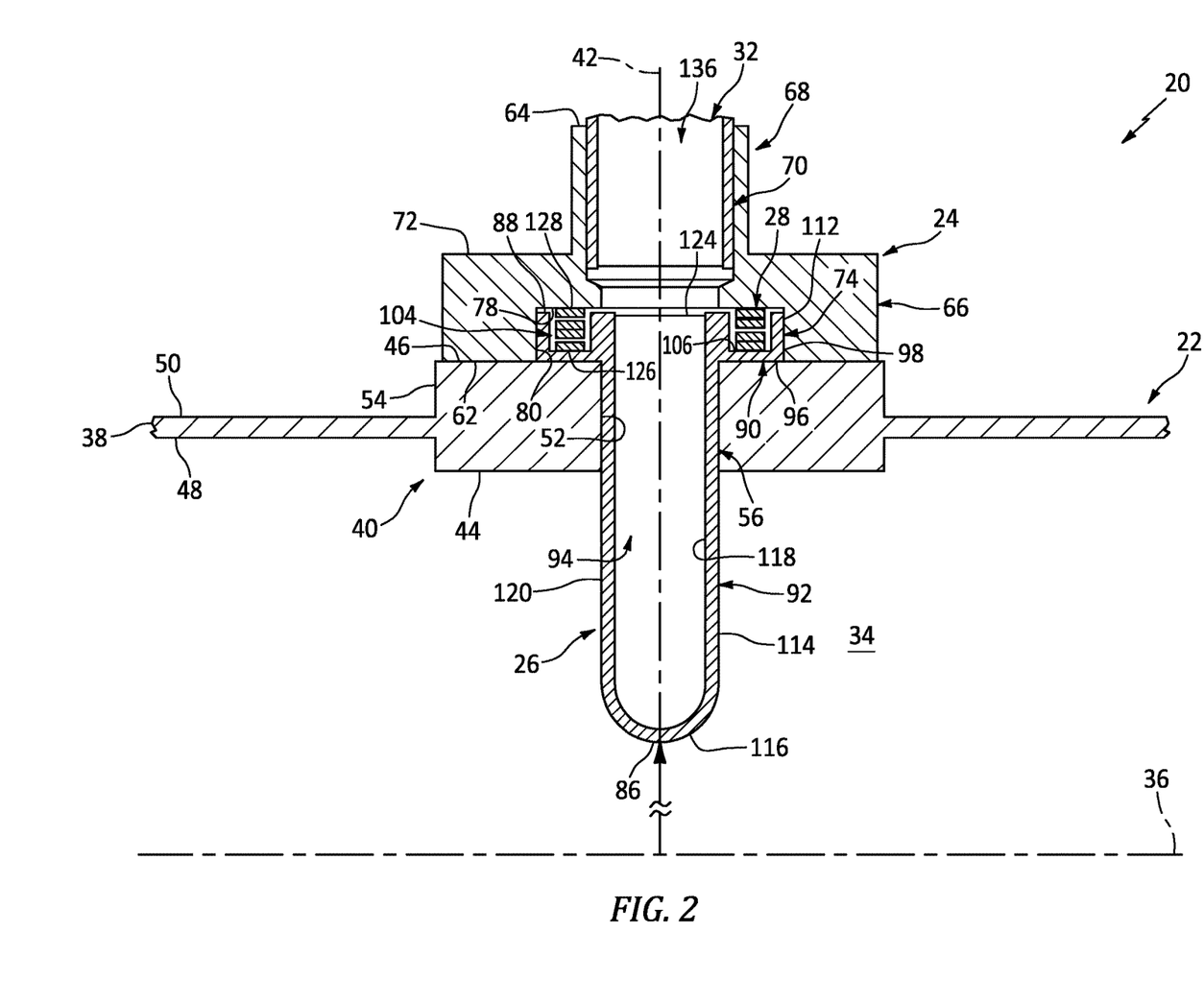
FIG. 2 is a partial side sectional illustration of the engine assembly.

FIGS. 1 and 2 illustrate an assembly 20 for a gas turbine engine. This engine assembly 20 includes an engine case 22, a component housing 24, an engine component 26, a spring element 28 and one or more fasteners 30 (see FIG. 1); e.g., bolts. Briefly, the engine component 26 of FIGS. 1 and 2 is configured as a fluid intake (e.g., a snorkel, a scoop, etc.) for a fluid system of the gas turbine engine, which fluid system also includes a fluid conduit 32 such as a pipe or a hose. The present disclosure, however, is not limited to such an exemplary engine component configuration nor to an engine assembly with a fluid system. The engine component 26, for example, may alternatively be configured as a sensor or any other device which, for example, may be installed from an exterior of the engine case 22 and/or may project into an interior space 34 of the engine case 22. For ease of description, however, the engine component 26 is described below as the fluid intake and the engine assembly 20 is described below as including the fluid conduit 32.

The engine case 22 of FIG. 2 extends longitudinally along a longitudinal centerline 36 of the engine assembly 20 and its engine case 22, which longitudinal centerline 36 may be coaxial with (or otherwise parallel with) a rotational axis of the gas turbine engine. The engine case 22 of FIG. 1 extends circumferentially about (e.g., completely around) the longitudinal centerline 36 providing the engine case 22 with, for example, a full-hoop body. The engine case 22 of FIG. 1 includes a case sidewall 38 and a case mount 40; e.g., a mounting boss.

The case mount 40 of FIGS. 1 and 2 extends axially along a centerline axis 42 (e.g., radially relative to the longitudinal centerline 36) between and to an interior side 44 of the case mount 40 and an exterior side 46 of the case mount 40, which centerline axis 42 may be a centerline axis of any one or more or all of the engine assembly elements 24, 26, 28, 32 and/or 40. The mount interior side 44 may be axially offset from an interior side 48 of the case sidewall 38 where, for example, the case mount 40 projects axially along the centerline axis 42 out from the case sidewall 38 (e.g., towards the longitudinal centerline 36) to the mount interior side 44. The mount exterior side 46 may be axially offset from an exterior side 50 of the case sidewall 38 where, for example, the case mount 40 projects axially along the centerline axis 42 out from the case sidewall 38 (e.g., away from the longitudinal centerline 36) to the mount exterior side 46. The case mount 40 extends radially relative to the centerline axis 42 (e.g., axially along and/or circumferentially about the longitudinal centerline 36) between and to an inner side 52 of the case mount 40 and an outer side 54 of the case mount 40. The case mount 40 of FIG. 1 includes a mount aperture 56 and one or more mount fastener apertures 58.

The mount aperture 56 is formed by a (e.g., cylindrical) inner surface of the case mount 40 at the mount inner side 52. This mount aperture 56 extends axially along the centerline axis 42 through the engine case 22 and its case mount 40 between and to the mount interior side 44 and the mount exterior side 46. The mount aperture 56 may have a circular cross-sectional geometry when viewed, for example, in a reference plane perpendicular to the centerline axis 42. The present disclosure, however, is not limited to such an exemplary mount aperture cross-sectional geometry.

The mount fastener apertures 58 of FIG. 1 are arranged circumferentially about the longitudinal centerline 36 on opposing sides of the mount aperture 56. Each of the mount fastener apertures 58 extends axially along a respective fastener axis 60 through (or into) the case mount where the fastener axis 60 may be parallel to the centerline axis 42. Each mount fastener aperture 58 of FIG. 1, for example, extends axially through the case mount 40 between and to the mount interior side 44 and the mount exterior side 46. Each mount fastener aperture 58 may be configured as a threaded bore in the case mount 40.

Referring to FIGS. 1 and 2, the component housing 24 extends axially along the centerline axis 42 between and to an interior side 62 of the component housing 24 and an exterior side 64 of the component housing 24. The component housing 24 of FIGS. 1 and 2 includes a housing base 66, a housing protrusion 68 and a housing passage 70.

The housing base 66 is disposed axially at the housing interior side 62. The housing base 66 of FIGS. 1 and 2, for example, extends axially along the centerline axis 42 between and to the housing interior side 62 and an exterior side 72 of the housing base 66. The housing base 66 includes an internal housing cavity 74 and one or more housing fastener apertures 76.

Figure 3:
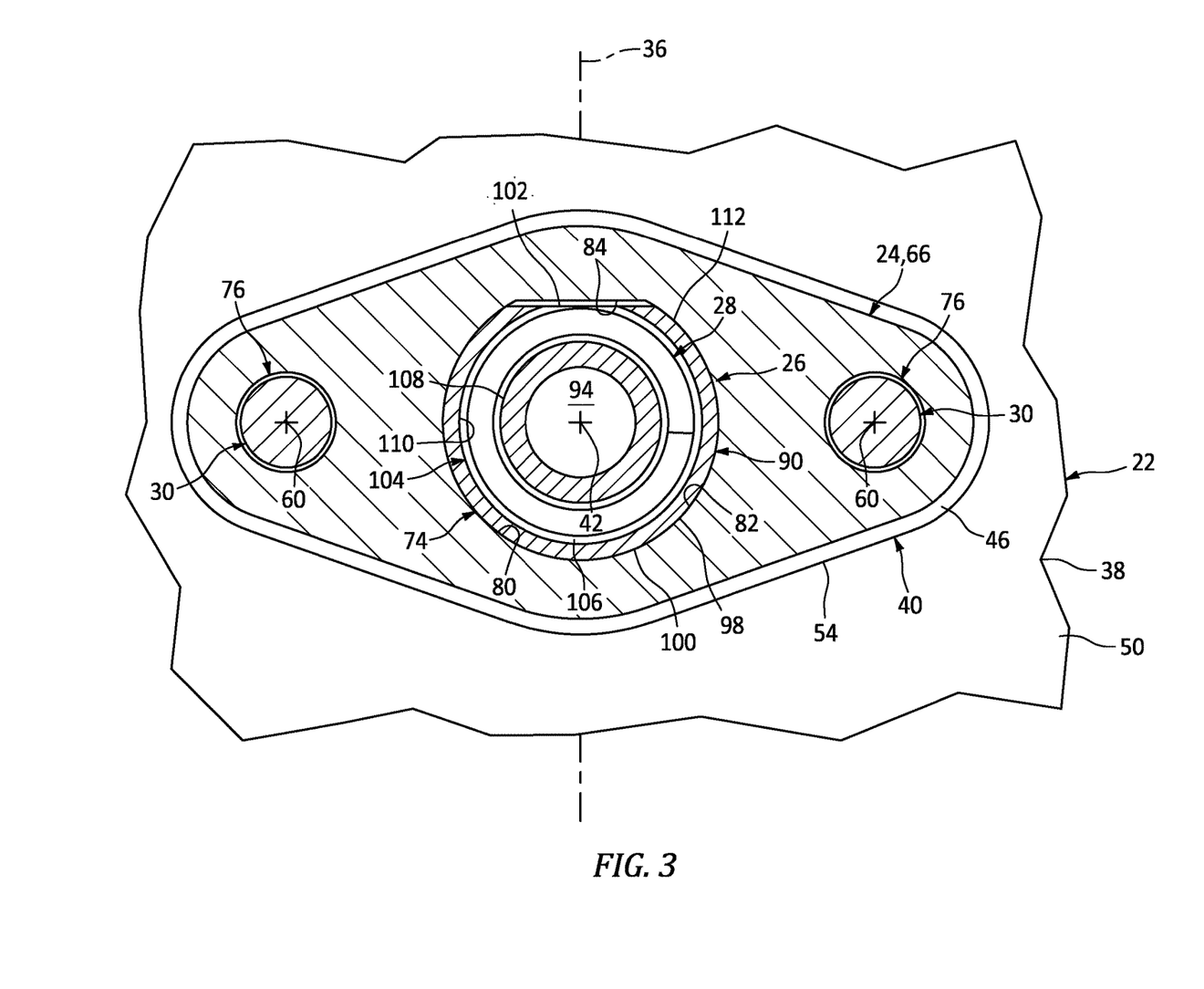
FIG. 3 is a cutaway illustration of a portion of the engine assembly.

The housing cavity 74 projects axially along the centerline axis 42 into the housing base 66 from the housing interior side 62 to an axial end 78 of the housing cavity 74. The housing cavity 74 extends radially relative to the centerline axis 42 within the housing base 66 to a radial outer side 80 of the housing cavity 74. Referring to FIG. 3, an inner periphery of the housing base 66 at the cavity outer side 80 has a cross-sectional geometry when viewed, for example, in the reference plane. The cross-sectional geometry of FIG. 3 includes a curved (e.g., arcuate, partially circular, etc.) section 82 and a straight (e.g., flat) section 84. The curved section 82 extends circumferentially about the centerline axis 42 between and to opposing ends of the straight section 84. The present disclosure, however, is not limited to such an exemplary cavity cross-sectional geometry.

The housing fastener apertures 76 of FIG. 1 are arranged circumferentially about the longitudinal centerline 36 on opposing sides of the housing cavity 74 and the housing passage Each of the housing fastener apertures 76 extends axially along the respective fastener axis 60 through the housing base 66. Each housing fastener aperture 76 of FIG. 1, for example, extends axially through the housing base 66 between and to the housing interior side 62 and the housing base exterior side 72. Each housing fastener aperture 76 may be configured as an unthreaded bore in the housing base 66.

Referring to FIGS. 1 and 2, the housing protrusion 68 is disposed axially at the housing exterior side 64. The housing protrusion 68 of FIGS. 1 and 2, for example, extends axially along the centerline axis 42 between and to the housing base 66 at its exterior side 72 and the housing exterior side 64.

The housing passage 70 extends axially along the centerline axis 42 into the component housing 24 from the housing exterior side 64 to the housing cavity 74. More particularly, the housing passage 70 extends axially from the housing exterior side 64, through the housing protrusion 68 and into the housing base 66 to the cavity axial end 78. The housing passage is thereby fluidly coupled with the housing cavity 74.

The engine component 26 extends axially along the centerline axis 42 between and to an interior end 86 of the engine component 26 and an exterior end 88 of the engine component 26. The engine component 26 includes a component base 90, a component protrusion 92 and a component passage 94.

The component base 90 is disposed at the component exterior end 88. The component base 90 of FIGS. 1 and 2, for example, extends axially along the centerline axis 42 from the component exterior end 88 to an interior end 96 of the component base 90. The component base 90 extends radially relative to the centerline axis 42 out from the component protrusion 92 to an outer side 98 of the component base 90. Referring to FIG. 3, an outer periphery of the component base 90 at the component base outer side 98 has a cross-sectional geometry when viewed, for example, in the reference plane. The cross-sectional geometry of FIG. 3 includes a curved (e.g., arcuate, partially circular, etc.) section 100 and a straight (e.g., flat) section 102. The curved section 100 extends circumferentially about the centerline axis 42 between and to opposing ends of the straight section 102. The present disclosure, however, is not limited to such an exemplary component base cross-sectional geometry. The cross-sectional geometry of the component base 90 of FIG. 3 is configured to match (e.g., be the same as) the cross-sectional geometry of the housing cavity 74.

Figure 4:
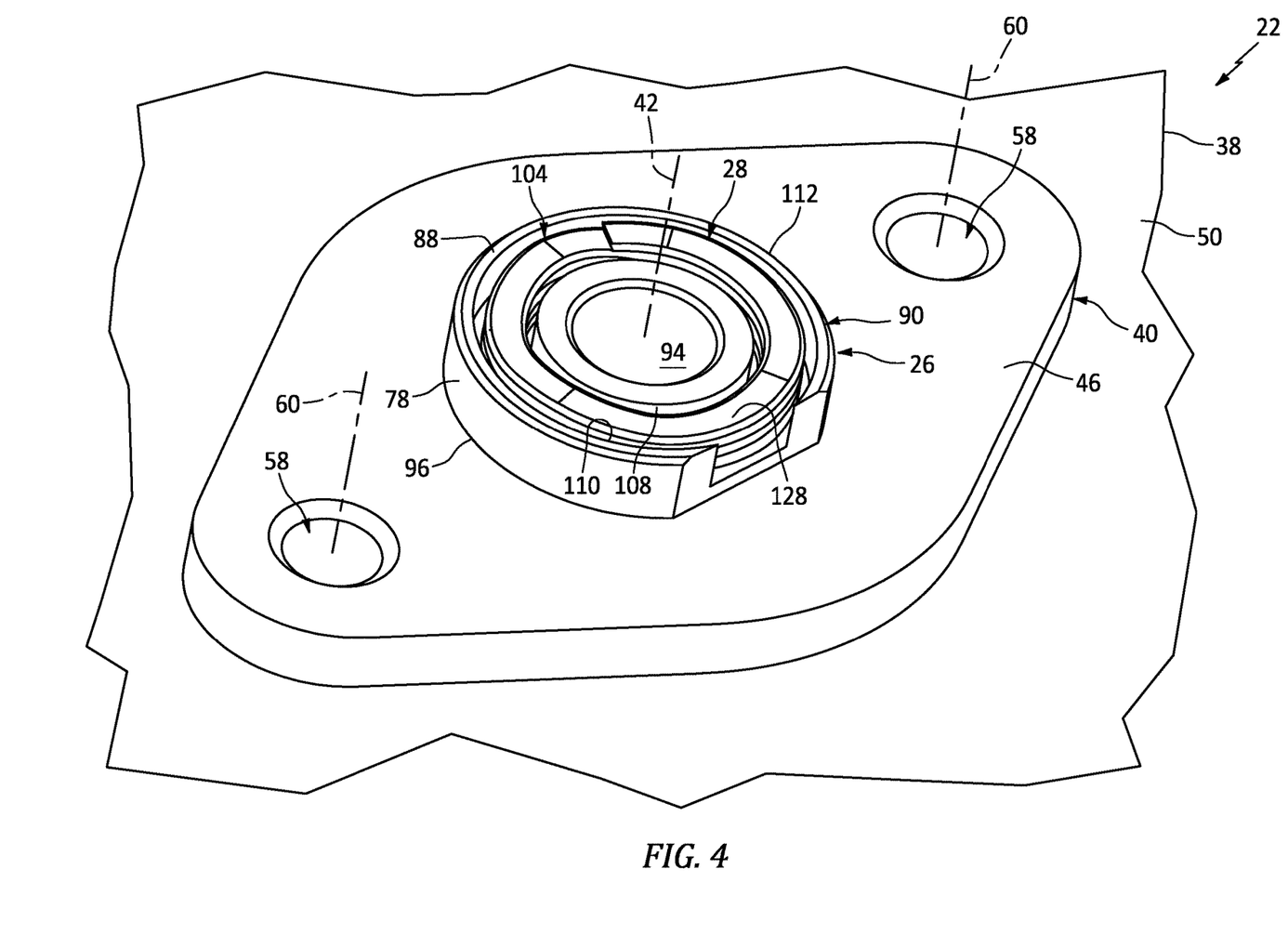
FIG. 4 is a partial perspective illustration of an engine case, an engine component and a spring element.

The component base 90 of FIGS. 1 and 2 includes a component channel 104 at the component exterior end 88. The component channel 104 projects axially into the component base 90 from the component exterior end 88 to an axial end 106 of the component channel 104. The component channel 104 of FIG. 3 extends radially relative to the centerline axis 42 within the component base 90 between and to an inner side 108 of the component channel 104 and an outer side 110 of the component channel 104. The component channel 104 extends circumferentially about (e.g., completely around) the centerline axis 42 and the component passage 94 within the component base 90 providing the component channel 104 with, for example, an annular geometry. The channel inner side 108 and the channel outer side 110 may each have a substantially circular cross-sectional geometry when viewed, for example, in the reference plane. The present disclosure, however, is not limited to such an exemplary channel cross-sectional geometry. Furthermore, while a sidewall 112 of the component base 90 forming the channel outer side 110 of FIGS. 3 and 4 extends partially about the centerline axis 42, this sidewall 112 may alternative completely circumscribe the component channel 104 in other embodiments.

Referring to FIGS. 1 and 2, the component protrusion 92 is disposed at the component interior end 86. The component protrusion 92 of FIGS. 1 and 2, for example, extends axially along the centerline axis 42 from the component interior end 86 to the component base interior end 96. The component protrusion 92 includes a tubular protrusion sidewall 114 and a protrusion endwall 116. The protrusion sidewall 114 extends axially along the centerline axis 42 between and to the component base 90 and the protrusion endwall 116. The protrusion sidewall 114 extends radially relative to the centerline axis 42 between and to an inner side 118 of the protrusion sidewall 114 and an outer side 120 of the protrusion sidewall 114. The protrusion endwall 116 closes an internal bore of the protrusion sidewall 114 at the component interior end 86. The protrusion endwall 116 of FIGS. 1 and 2 is substantially hemispherical; however, the present disclosure is not limited thereto.

The component passage 94 of FIG. 1 extends (e.g., generally axially along the centerline axis 42) within the engine component 26 between and to an inlet 122 to the component passage 94 and an outlet 124 from the component passage 94. The passage inlet 122 is disposed at (e.g., on, adjacent or proximate) the component interior end 86. The passage inlet 122 of FIG. 1, for example, is formed by an orifice through the protrusion sidewall 114. The passage outlet 124 is disposed at the component exterior end 88. The passage outlet 124 of FIG. 1, for example, is formed by an orifice in the component base 90.

The spring element 28 of FIGS. 1 and 2 extends axially along the centerline axis 42 between and to an interior end 126 of the spring element 28 and an exterior end 128 of the spring element 28. The spring element 28 extends radially relative to the centerline axis 42 between and to an inner side of the spring element 28 and an outer side of the spring element 28. The spring element 28 extends circumferentially about (e.g., completely around) the centerline axis 42 providing the spring element 28 with, for example, a full-hoop body; see also FIGS. 3 and 4.

Figure 5:
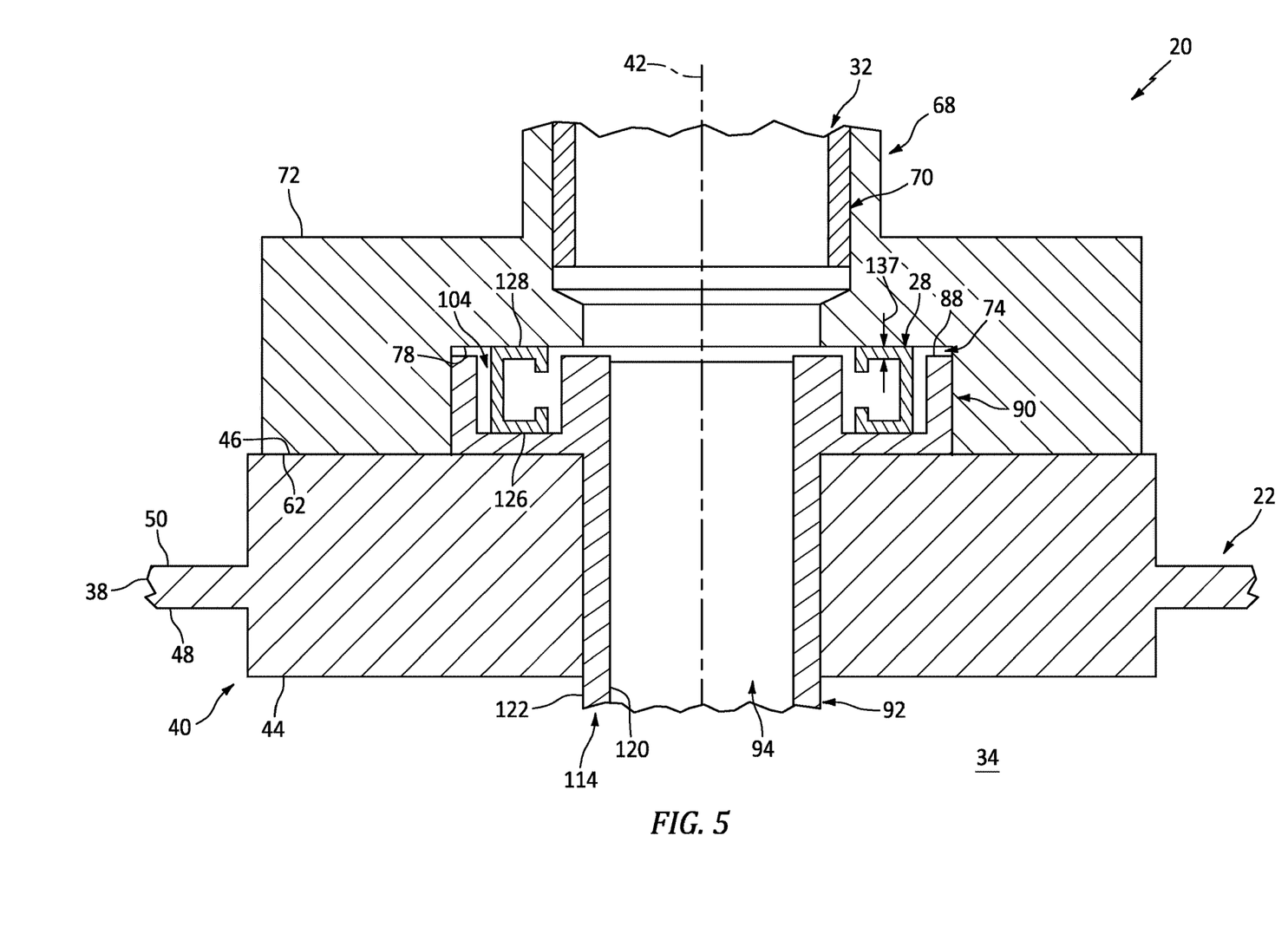
FIG. 5 is a partial side sectional illustration of the engine assembly configured with a gasket spring element.

Referring to FIGS. 1-4, the spring element 28 may be configured as an annular coil spring. Alternatively, referring to FIG. 5, the spring element 28 may be configured as an annular gasket such as, but not limited to, a C-gasket and/or seal ring. The present disclosure, however, is not limited to the foregoing exemplary spring element configurations. The spring element 28, for example, may alternatively be configured as an annular wave spring or any other device capable of exerting an axial outward bias force between its axial ends 126 and 128.

Referring to FIG. 1, the engine component 26 is mated with the engine case 22. More particularly, the component base 90 is arranged with the case mount 40 where the interior end 96 of the component base 90 axially contacts or otherwise engages the mount exterior side 46. The component protrusion 92 is received by the mount aperture 56. More particularly, the component protrusion 92 projects axially along the centerline axis 42 out from the component base through the mount aperture 56 and out from the mount interior side 44 into the interior space 34 (e.g., a cavity, a plenum, etc.) within the engine case 22 to the component interior end 86; e.g., an axial distal end of the component protrusion 92.

Figure 6:
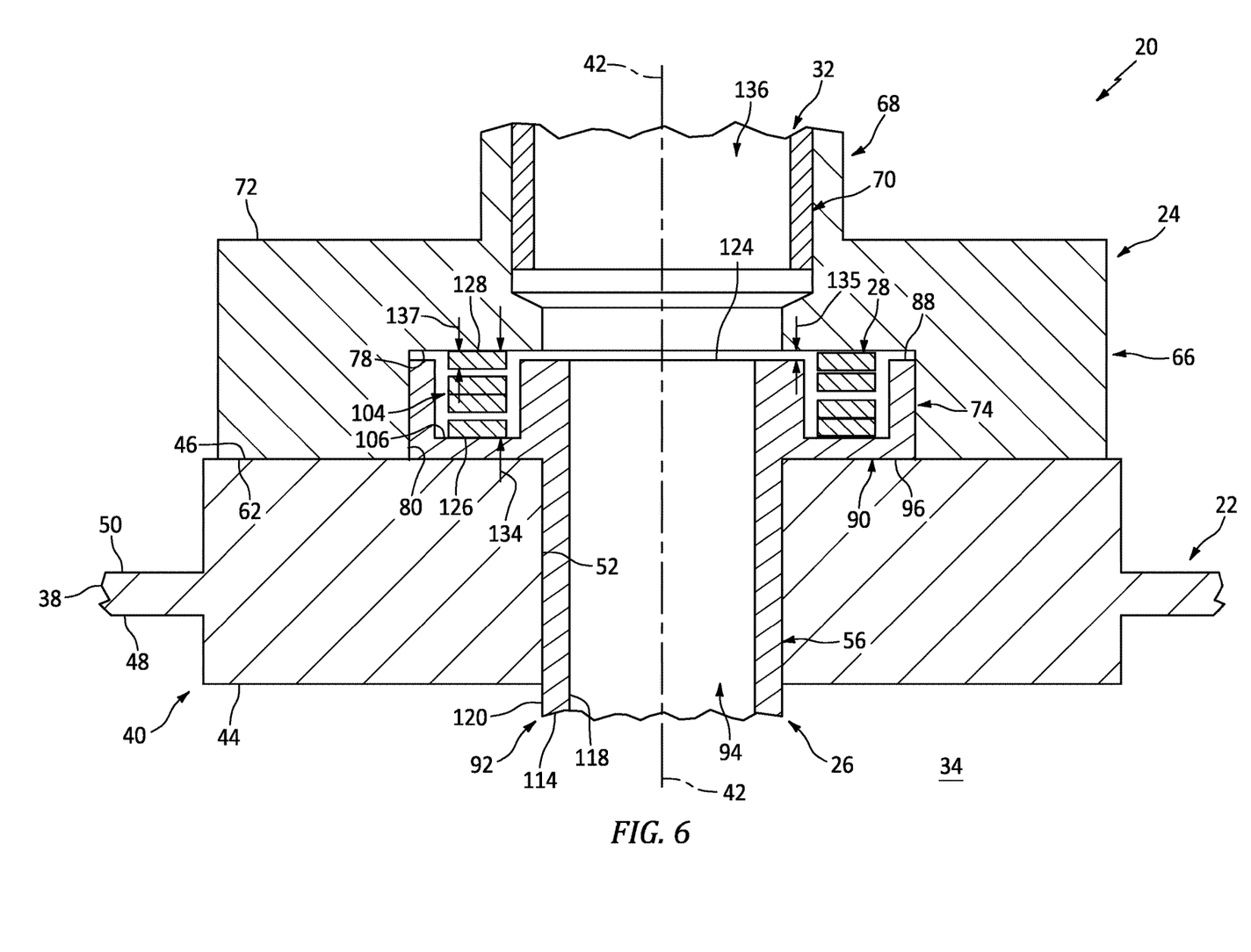
FIG. 6 is a partial side sectional illustration of the engine assembly configured with a coil spring element.

Referring to FIG. 6, the spring element 28 is seated in the component channel 104. The spring element interior end 126 axially contacts or otherwise engages the axial end 78 of the component channel 104.

Referring to FIG. 1, the component housing 24 is mated with the engine assembly elements 22, 26 and 28. More particularly, the housing base 66 is arranged with the case mount where the housing interior side 62 axially contacts or otherwise engages the mount exterior side 46. The component base 90 and the spring element 28 are arranged within the housing cavity 74. Referring to FIG. 6, an exterior portion of the spring element 28—disposed outside of the component channel 104—projects axially along the centerline axis 42 out from the component exterior end 88 to the spring element exterior end 128. This spring element exterior end 128 axially contacts or otherwise engages the axial end 78 of the housing cavity 74. The engine component 26 of FIG. 6, however, is axially spaced from the component housing 24 and its housing base 66. An axial gap, in particular, extends axially between and is formed by the component exterior end 88 and the cavity axial end 78.

Referring to FIG. 3, the straight section 102 of the component base is aligned with the straight section 84 of the housing cavity 74. The engine component 26 is thereby clocked about the centerline axis 42 in a predetermined position. Furthermore, the straight sections 84 and 102 may engage one another during gas turbine operation to limit or prevent rotation of the engine component 26 about the centerline axis 42 relative to the engine assembly elements 22 and 24. The geometries of the housing cavity 74 and the component base 90 thereby collectively provide an anti-rotation feature.

Referring to FIG. 1, each fastener 30 is mated with a respective set of the fastener apertures 58 and 76. More particularly, each fastener 30 includes a head 130 and a threaded shank 132 connected to the head 130. The head 130 is abutted axially against the housing base 66 at its exterior side 72. The shank 132 projects axially out from the head 130 through a respective one of the housing fastener apertures 76 and is threaded into a respective one of the mount fastener apertures 58.

Tightening of the fasteners 30 facilitate the axial contact between the component housing 24 and the engine case 22. The tightening of the fasteners 30 also facilitates compression of the spring element 28 axially between the component housing 24 and the engine component 26. For example, referring to FIG. 6, the spring element 28 has an axial height 134 between its spring element interior end 126 and its spring element exterior end 128. The element height 134 when the spring element 28 is relaxed (e.g., where the engine assembly 20 is disassembled and/or not compressed) is greater than the element height 134 when the component housing 24 is attached to the engine case 22 by the fasteners 30 (see FIG. 1). The spring element 28 of FIG. 6 may thereby press the component base 90 axially away from the component housing 24 and against the engine case 22. This biasing of the engine component 26 against the engine case 22 may reduce or prevent movement (e.g., wobbling, shaking, etc.) of the engine component 26 relative to the engine case 22 during gas turbine operation.

Referring to FIG. 1, the fluid conduit 32 is attached to the component housing 24. The fluid conduit 32 of FIG. 1, for example, projects axially along the centerline axis 42 into the housing passage 70. The component housing 24 and its housing passage 70 may thereby fluidly couple the engine component 26 and its component passage 94 to the fluid conduit 32 and an internal passage 136 within the fluid conduit 32.

In some embodiments, the engine component 26 may be positioned within the interior space 34 such that the passage inlet 122 is downstream relative to fluid (e.g., gas, compressed air) flowing within the interior space 34. With such an arrangement, the fluid entering the component passage 94 through the passage inlet 122 is less likely to carry debris such as, but not limited to, sand, dirt and/or other particulates. Of course, in other embodiments, the engine component 26 may be alternatively positioned relative to the fluid flow within the interior space 34.

Referring to FIG. 6, the axial gap between the cavity axial end 78 and the component exterior end 88 has an axial height 135. In some embodiments, the axial gap height 135 may be sized smaller than a material thickness 137 (e.g., an axial thickness, a radial thickness, etc.) of material forming the spring element 28; see also FIG. 5. With such a configuration, in an unlikely event the spring element breaks, debris (e.g., fragments and/or broken sections) from the spring element 28 may not or is at least less likely to pass through the axial gap and contaminate the fluid flowing from the component passage 94 to the conduit passage 136. The present disclosure, however, is not limited to such an exemplary dimensional relationship.

Figure 7:
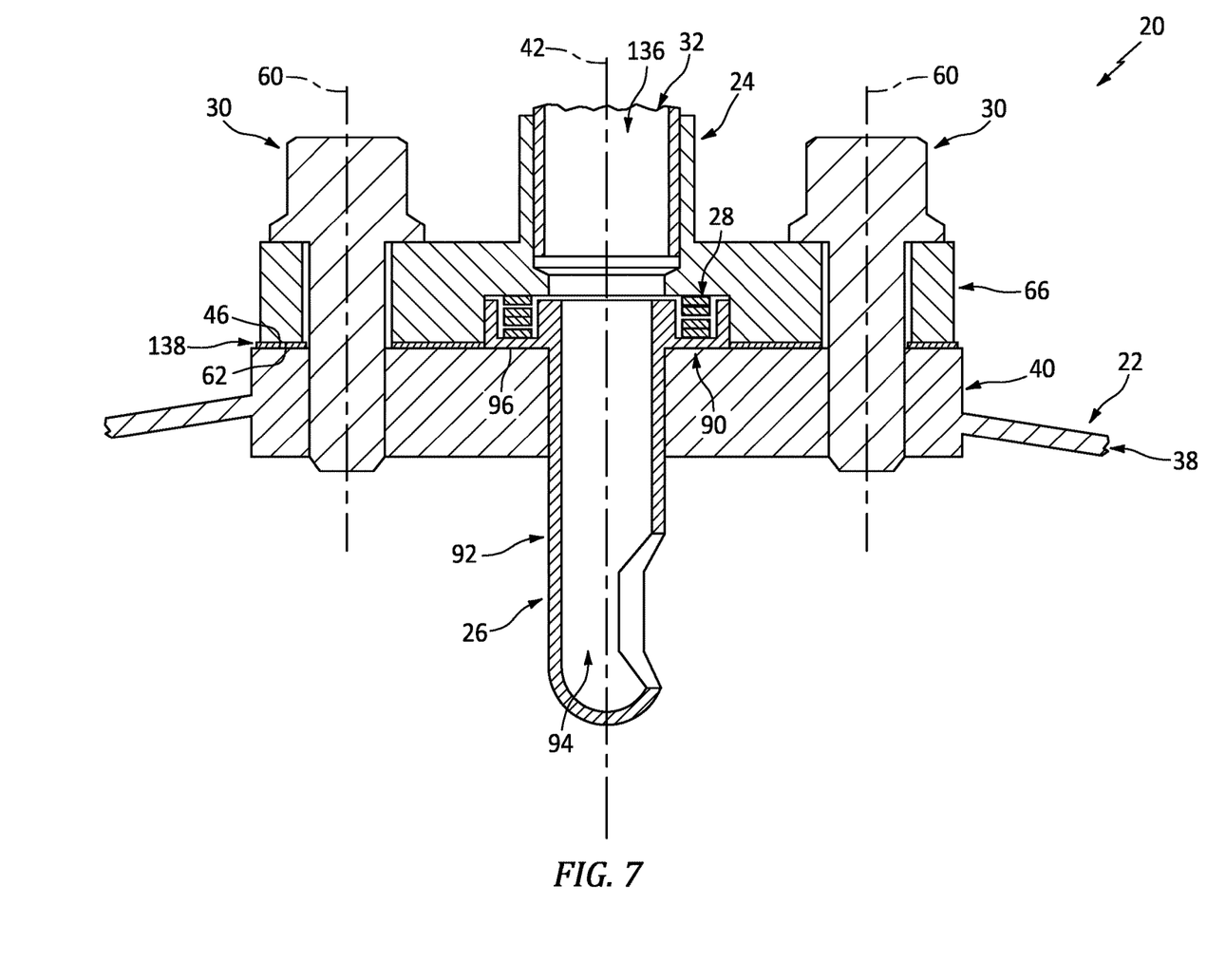
FIG. 7 is a partial cross-sectional illustration of the engine assembly configured with a gasket.

In some embodiments, referring to FIG. 7, the engine assembly 20 may also include a gasket 138. This gasket 138 is disposed axially between the engine case 22 and the component housing 24. The gasket 138 of FIG. 7, for example, is axially between and contacts the mount exterior side 46 and the housing interior side 62. The engine component 26 and its component base 90 of FIG. 7, however, still axially contacts the engine case 22 and its case mount 40. Of course, in other embodiments, it is contemplated the gasket 138 may also or alternatively be disposed axially between and contact the component base interior end 96 and the mount exterior side 46.

In some embodiments, referring to FIG. 6, the spring element 28 is disposed axially between the component base 90 and the housing base 66. It is contemplated, however, the spring element 28 may alternatively be disposed axially between the component base 90 and the case mount 40.

Referring to FIG. 6, the housing cavity 74 extends axially between and is formed by the mount exterior side 46 and the cavity axial end 78. The housing cavity 74 of FIG. 6 projects axially into the component housing 24, but not into the engine case 22. However, in other embodiments, it is contemplated the cavity 74 may also or alternatively project axially into the engine case 22 and its case mount 40.

Figure 8:
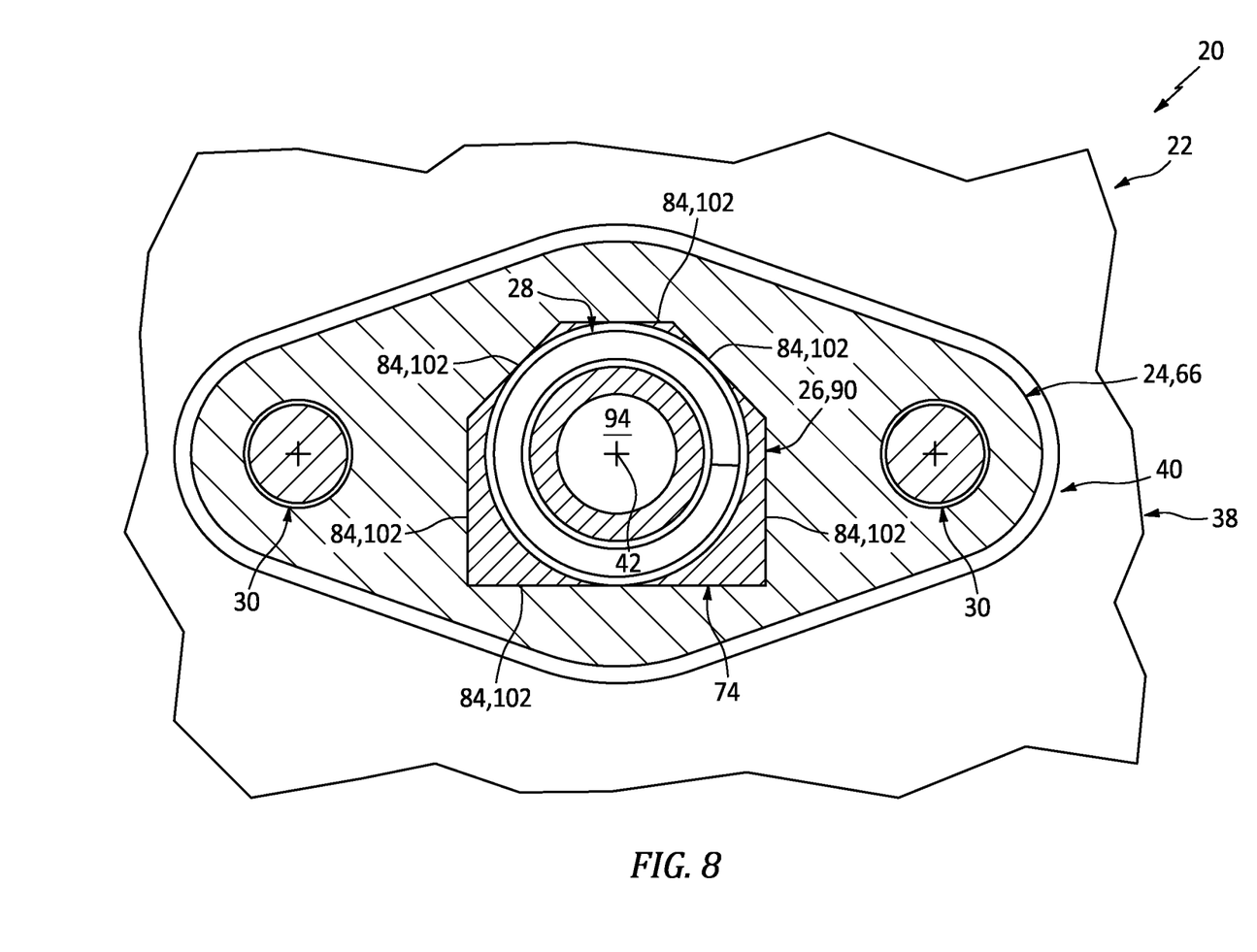
FIG. 8 is a cutaway illustration of a portion of the engine assembly configured with another anti-rotation feature configuration.

The cross-sectional geometries of FIG. 3 are described above as each including a single curved section 82, 100 and a single straight section 84, 102. The present disclosure, however, is not limited to such exemplary cross-sectional geometries. In the embodiment of FIG. 8, for example, each of the cross-sectional geometries includes a plurality of the straight sections 84, 102. Each cross-sectional geometry, for example, has a polygonal shape. Examples of the polygonal shape include, but are not limited to, a triangle, a square, a trapezoid, a pentagon and an octagon. The cross-sectional geometry, however, may be asymmetrical to facilitate proper placement of the passage inlet 122 of FIG. 1 within the interior space 34.

Figure 9:
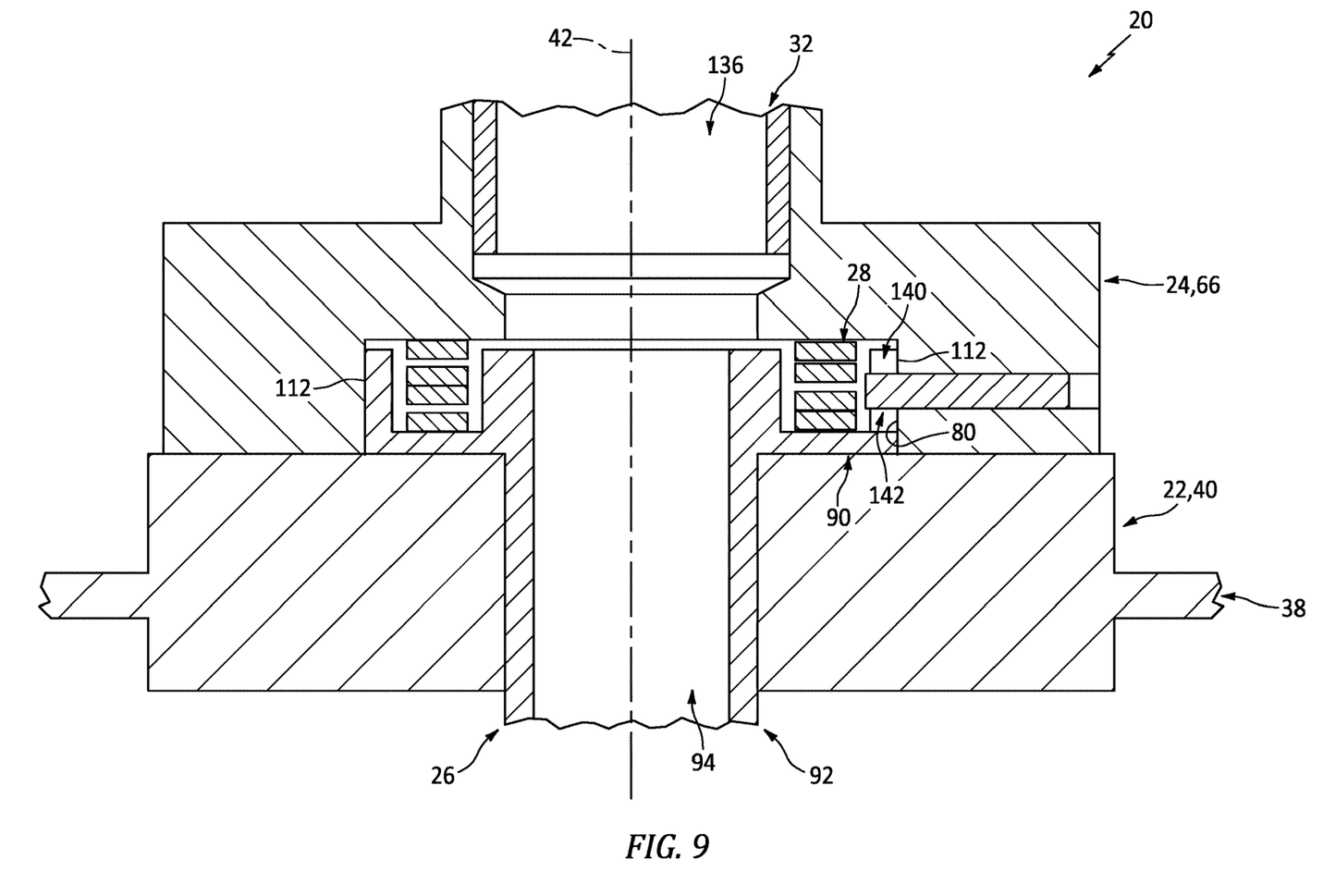
FIG. 9 is a partial side sectional illustration of the engine assembly configured with still another anti-rotation feature configuration.

The anti-rotation feature of FIGS. 3 and 8 is provided based on the cross-sectional geometries of the component base 90 and the housing cavity 74. The present disclosure, however, is not limited to such exemplary anti-rotation feature configurations. In the embodiment of FIG. 9, for example, the engine component 26 is alternatively configured with a notch 140 that projects radially into the component base 90; e.g., through the sidewall 112. The component housing 24 is correspondingly configured with a protrusion 142 that projects out from the cavity outer side 80 radially into the notch 140. This protrusion 142 may be formed discrete from the housing base 66. The protrusion 142, for example, may be configured as a fastener such as, but not limited to, a timing pin, a setscrew, etc. Alternatively, the protrusion 142 may be formed integral with the housing base 66.

Figure 10:
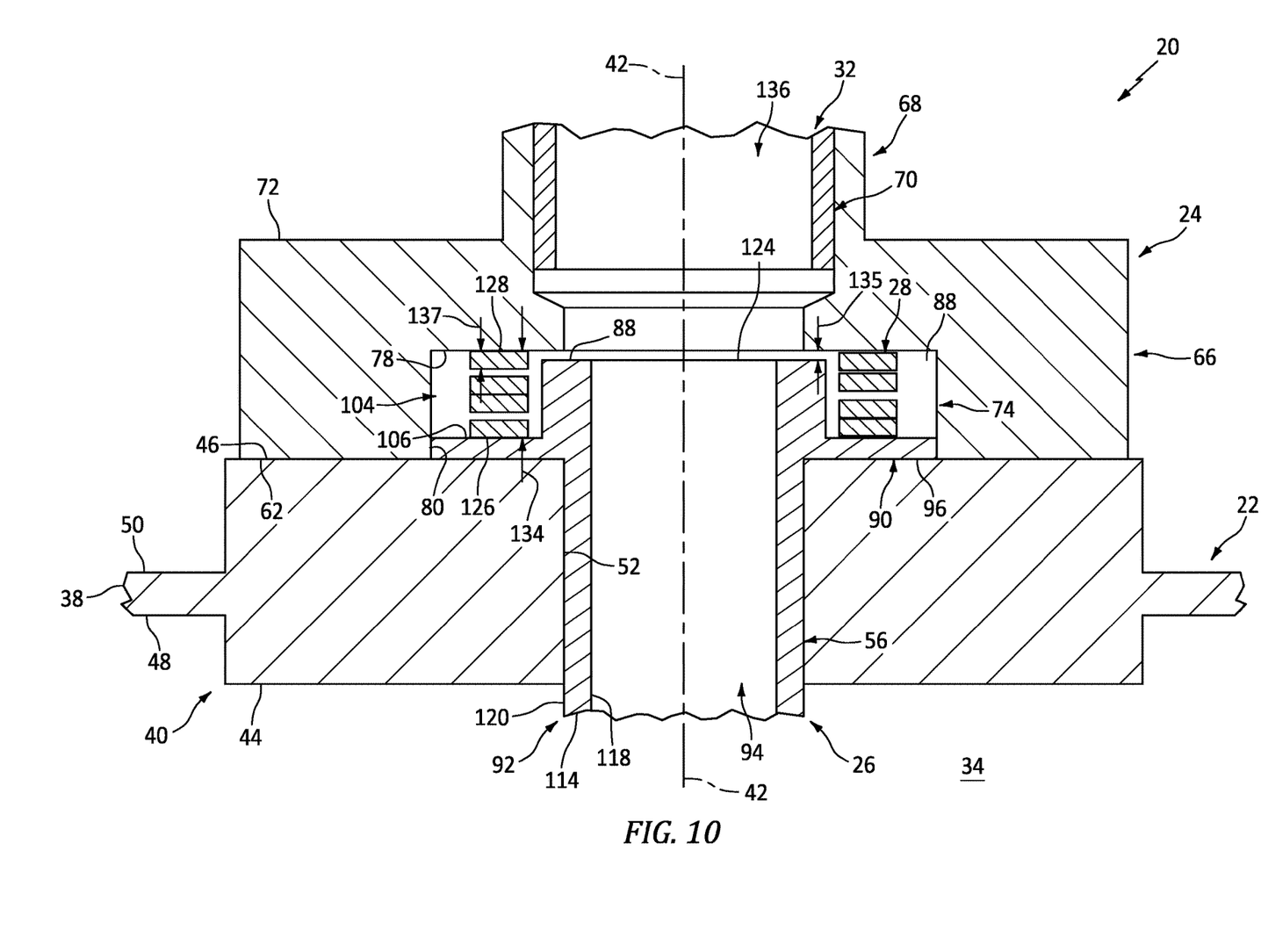
FIG. 10 is a partial side sectional illustration of the engine assembly configured with another component base arrangement.

In some embodiments, referring to FIG. 3, the component channel 104 may extend radially relative to the centerline axis 42 within the component base 90 between and to the channel inner side 108 and the channel outer side 110. In other embodiments, referring to FIG. 10, the component channel 104 may alternatively extend radially relative to the centerline axis 42 into the component base 90 from the component base outer side 98 to the channel inner side 108. The annular, arcuate and/or segmented rim(s) in FIGS. 3 and 8 extending about the component channel 104 may thereby be omitted.

Figure 11:
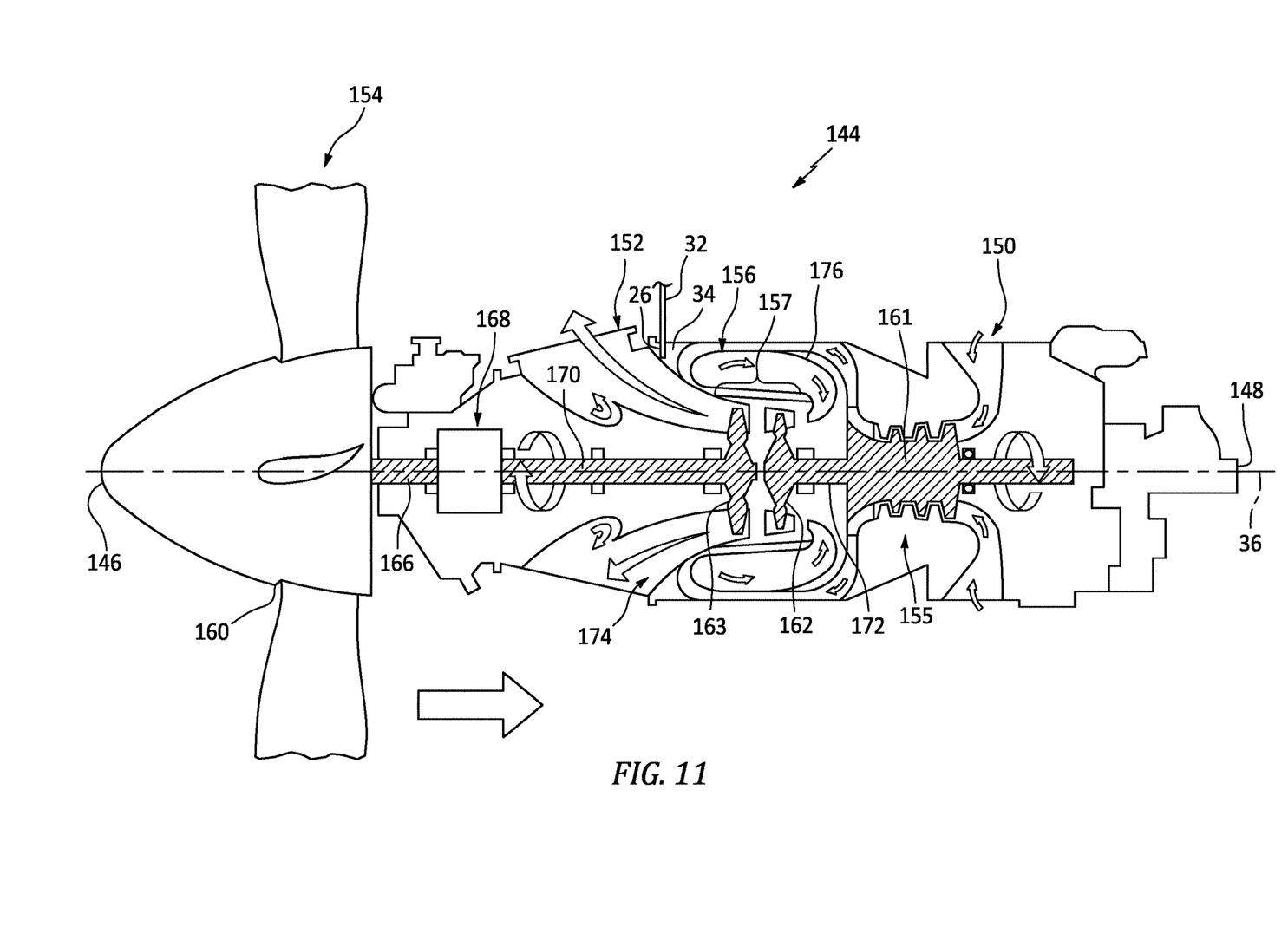
FIG. 11 is a side schematic illustration of a turboprop gas turbine engine.

FIG. 11 illustrates an example of the gas turbine engine with which the engine assembly 20 described above may be included. This gas turbine engine is configured as a turboprop gas turbine engine 144. The gas turbine engine 144 of FIG. 11 extends axially along the longitudinal centerline 36 between a forward end 146 of the gas turbine engine 144 and an aft end 148 of the gas turbine engine 144. The gas turbine engine 144 of FIG. 11 includes an airflow inlet 150, an exhaust 152, a propulsor (e.g., a propeller) section 154, a compressor section 155, a combustion section 156 and a turbine section 157.

The airflow inlet 150 is towards the engine aft end 148, and aft of the engine sections 154-157. The exhaust 152 is located towards the engine forward end 146, and axially between the propulsor section 154 and the engine sections 155-157.

The propulsor section 154 includes a propulsor rotor 160; e.g., a propeller. The compressor section 155 includes a compressor rotor 161. The turbine section 157 includes a high pressure turbine (HPT) rotor 162 and a low pressure turbine (LPT) rotor 163, where the LPT rotor 163 may be referred to as a power turbine rotor and/or a free turbine rotor. Each of these turbine engine rotors 160-163 includes a plurality of rotor blades arranged circumferentially about and connected to one or more respective rotor disks or hubs.

The propulsor rotor 160 of FIG. 11 is connected to the LPT rotor 163 sequentially through a propulsor shaft 166, a geartrain 168 (e.g., a transmission) and a low speed shaft 170, where the geartrain 168 may be configured as an epicyclic geartrain. The compressor rotor 161 is connected to the HPT rotor 162 through a high speed shaft 172.

During turbine engine operation, air enters the gas turbine engine 144 through the airflow inlet 150. This air is directed into a core flowpath 174 which extends sequentially from the airflow inlet 150, through the engine sections 155-157 (e.g., an engine core), to the exhaust 152. The air within this core flowpath 174 may be referred to as "core air". This core flowpath 174 may include the interior space 34 of FIG. 1; e.g., the interior space 34 may be a combustor plenum surrounding a combustor 176 within the combustor section 156.

The core air is compressed by the compressor rotor 161 and directed into a combustion chamber of the combustor 176. Fuel is injected into the combustion chamber and mixed with the compressed core air to provide a fuel-air mixture. This fuel-air mixture is ignited and combustion products thereof flow through and sequentially cause the HPT rotor 162 and the LPT rotor 163 to rotate. The rotation of the HPT rotor 162 drives rotation of the compressor rotor 161 and, thus, compression of air received from the airflow inlet 150. The rotation of the LPT rotor 163 drives rotation of the propulsor rotor 160, which propels air outside of the gas turbine engine 144 in an aft direction to provide forward aircraft thrust.

The engine assembly 20 may be included in various turbine engines other than the ones described above. The engine assembly 20, for example, may be included in a geared turbine engine where a gear train connects one or more shafts to one or more rotors in a fan section, a compressor section and/or any other engine section. Alternatively, the engine assembly 20 may be included in a turbine engine configured without a gear train; e.g., a direct drive turbine engine. The turbine engine may be configured with a single spool, with two spools, or with more than two spools. The turbine engine may be configured as a turbofan engine, a turbojet engine, a turboprop engine, a turboshaft engine, a propfan engine, a pusher fan engine, an auxiliary power unit (APU) or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
   a case comprising an aperture that extends axially along an axis through the case;
   a housing attached to the case with a cavity that is formed by and axially between the housing and the case;
   a component including a base and a projection, the base disposed within the cavity and axially engaging the case, and the projection projecting out from the base and axially through the aperture; and
   a coil spring disposed within the cavity, the coil spring compressed axially between and contacting the base and the housing;
   wherein the base includes a notch that projects radially into the base; and
   wherein the housing includes a protrusion that projects radially into the notch.

2. The assembly of claim 1, wherein the protrusion comprises a fastener.

* * * * *